United States Patent Office 3,766,160
Patented Oct. 16, 1973

3,766,160
POLYMERIZATION PROCESS
Anthony David Caunt, Welwyn Garden City, England, assignor to Imperial Chemical Industries Limited, London, England
No Drawing. Filed July 15, 1971, Ser. No. 165,765
Claims priority, application Great Britain, July 15, 1970, 34,315/70, 34,316/70; Apr. 23, 1971, 11,010/71, 11,011/71
Int. Cl. C08f 1/56, 3/10
U.S. Cl. 260—93.7                     13 Claims

ABSTRACT OF THE DISCLOSURE

An olefin polymeriaztion catalyst which comprises titanium trichloride, an organo-aluminum compound and a complex compound of an element of Group IV which is the product of reacting compounds of the type $ME_{b-o}R_o$ and $H(X\text{—}G\text{—}L)$ were M is an element of Group IV of the Periodic System; E is $-NR'_2$ or $-OR'$ where R' is methyl or ethyl; R is hydrocarbyl; X is O, S, NR or PR; G is a bivalent organic radical such that X and L are separated by not more than 3 carbon atoms; L is, for example, $-OR$; b is the valency of M; and o has a value of 0 to 2. The compound $ME_{b-o}R_o$ can be $Ti[N(CH_3)_2]_4$; $nBu_2Sn[N(CH_3)_2]_2$ or $Sn[N(CH_3)_2]_4$ and the compound $H(X\text{—}G\text{—}L)$ can be an alkanolamine, a diamine or an aminothiol. The reaction product can be a simple compound of the type $ME_m(X\text{—}G\text{—}L)_nR_o$ where m is 0 to 3; n is 1 to 4; and o is 0 to 2; for example $nBu_2Sn[OCH_2CH_2N(CH_3)_2]_2$; $[(CH_3)_2N]Sn[OCH_2CH_2N(CH_3)_2]_3$ and $$Sn[OCH_2CH_2N(CH_3)_2]_4$$

or a condensation product including more than one metal atom, the atoms being linked by —O— or —NR'—. The catalyst gives a lower proportion of soluble polymer compared to the system $TiCl_3$/organo-aluminum compound, when used to polymerize propylene.

The present invention relates to catalysts for the polymerization of olefines and in particular to materials suitable for use as the third component in such catalysts and catalysts including such third components.

The low pressure polymerization of olefines, particularly ethylene and propylene, to give high molecular weight polymers has been practised commercially for several years. The catalyst used for such polymerizations is commonly referred to as a "Ziegler" catalyst and this type of catalyst comprises a compound of a transition metal and an organo-metallic compound of aluminum or an element of Group I or II.

In order to obtain polymers having a high proportion of crystallinity the catalysts used normally comprise a solid compound of a transition metal, wherein the transition metal has a valency below its maximum, together with the organo-metallic compound. The transition metal compound is usually a halide and for the production of crystalline polymers the most widely used compound is titanium trichloride, which term is used to include pure titanium trichloride and also impure titanium trichloride associated or combined with other compounds, typically aluminum chloride, and produced by the reduction of titanium tetrachloride with, for example, aluminum metal or organo-aluminium compounds. The most extensively used organo-metallic compound is an organo-aluminium compound such as an aluminium trialkyl or an aluminium dialkyl halide.

Propylene can be polymerized with titanium trichloride and an organo-aluminium compound to give a high yield of polymer based on the catalyst used. However, the polymer produced still contains appreciable quantities of catalyst residues and for most applications it is necessary to remove most of these catalyst residues, this being done by washing with a suitable reagent to remove the catalyst. Typically, the polymer is first treated with an alcohol to terminate catalytic activity and then washed several times with water to remove the catalyst. Such catalyst removal operations increase the cost of producing the polymer.

Attempts have been made to eliminate the need to remove catalyst residues by polymerizing the monomer to give a yield of polymer based on catalyst used which is considerably in excess of the yield normally obtained. When polymerizing to such high yields the amount of catalyst remaining in the polymer is relatively small, for example, less than 50 parts per million by weight based on the polymer obtained. A disadvantage of polymerizing to very high yields is that the polymer obtained contains a higher proportion of soluble polymer than is contained in polymer produced in the more normal yields.

Attempts have been made to reduce the proportion of soluble polymer produced by including a third component in the catalyst system. Whilst some of these third components do reduce the amount of soluble polymer produced, in many cases the polymerization rate is adversely affected by the third component.

According to the present invention there is provided an olefine polymerization catalyst comprising a solid compound of a transition metal wherein the said metal has a valency below its maximum, an aluminium trihydrocarbyl or aluminium dihydrocarbyl hydride compound, and a complex compound of an element of Group IV of the Periodic System which is the reaction product of a compound of formula $$ME_{b-o}R_o$$

and a compound of formula $$H(X\text{—}G\text{—}L)$$

where

M is an element of Group IV of the Periodic System having an atomic number greater than six;
E is the group $-NR'_2$ or $-OR'$ where R' is a methyl or ethyl group;
X is O, S, NR or PR;
R is a hydrocarbyl group;
G is a bivalent organic radical such that X and L are separated by not more than 3 carbon atoms;
L is OR, SR, $-NR_2$, $-PR_2$ or a heterocyclic ring system whereof the heteroatom is O, S, N or P which is not directly linked to hydrogen;
b is the valency of M; and
o has a value of 0 to 2.

Preferably the transition metal is titanium and it is particularly preferred to use titanium trichloride. The aluminium compound is conveniently an aluminium trialkyl or dialkyl aluminium hydride and of these compounds aluminium triethyl is preferred since catalysts including this component give a high polymerization rate.

Thus, preferred catalysts in accordance with the present invention comprise titanium trichloride, aluminium triethyl and, as a third component, a complex compound of an element of Group IV of the Periodic System which is the reaction product of a compound of formula $$ME_{b-o}R_o$$

and a compound of formula $$H(X-G-L)$$

all as hereinbefore defined.

It is preferred that the complex compound is the reaction product of a compound of the type $M(NR'_2)_{b-o}R_o$ and in particular it is preferred to use a tin compound. It is also convenient, but not essential, to use compounds of the type $M(NR'_2)_b$ in preparing the reaction product.

The compound $H(X-G-L)$ can be, for example, an alkanolamine, a diamine or an aminothiol compound. We have obtained satisfactory polymerization systems using, as the third component, the reaction product of $$Sn(NR'_2)_4 \text{ and } HO(CH_2)_xNR_2$$

where $x$ is 2 or 3.

The reaction product is formed with the evolution of $HNR'_2$ or $HOR'$ although it has been found that the reaction does not always terminate at this stage but may continue further with the evolution of, for example, $NR'_3$ and the possible formation of a more complex compound including more than one atom of M.

The reaction product is preferably preformed since otherwise there is a possibility of reaction occurring between the organo-aluminium compound and any unreacted $H(X-G-L)$. The reaction product is believed to be formed by the replacement of one or more of the groups E by a corresponding number of groups $X-G-L$ to give a product having the general formula $$ME_m(X-G-L)_nR_o$$

where

M, E, X, G, L, R and $o$ are as defined;
$m$ has a value of 0 to 3;
$n$ has a value of 1 and 4; and
$m+n+o$ is equal to the valency of M;

or complexes of M containing more than one atom of M in which the atoms M are linked by at least one bivalent group $-NR'-$ or $-O-$ wherein each of said groups replaces one of the groups E or R.

Thus, according to a further aspect of the present invention there is provided an olefine polymerization catalyst comprising a solid compound of a transition metal wherein said metal has a valency below its maximum, preferably titanium trichloride; an aluminium trihydrocarbyl or aluminium dihydrocarbyl hydride compound, preferably aluminium triethyl and, as a third compound, a complex compound having the general formula $$ME_m(X-G-L)_nR_o$$

or a complex of said product containing more than one atom of M, all as hereinbefore defined.

The reaction product which is used as the third component of the catalyst may be a compound of Formulae I to XIII, particularly tin compounds of Formulae III to XIII.

| | |
|---|---|
| $(CH_3)_2Si[OCH_2CH_2N(CH_3)_2]_2$ | (I) |
| $[N(CH_3)_2]_2Ti[OCH_2CH_2N(CH_3)_2]_2$ | (II) |
| $(nC_4H_9)_2Sn[OCH_2CH_2N(CH_3)_2]_2$ | (III) |
| $[N(CH_3)_2]Sn[OCH_2CH_2N(CH_3)_2]_3$ | (IV) |
| $Sn[OCH_2CH_2N(CH_3)_2]_4$ | (V) |
| $Sn[OCH_2CH_2OCH_3]_4$ | (VI) |
| $Sn[2\text{-pyridylmethoxy}]_4$ | (VII) |

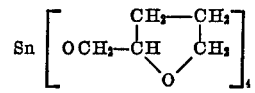
(VIII)

$Sn[SCH_2CH_2N(CH_3)_2]_4$ (IX)

The reaction product may be a compound obtained by the partial replacement of one group by another to give a mixture of compounds such as the mixture stoichiometrically represented by the formula $$Sn[N(CH_3)_2]_{1.3}[N(CH_3)CH_2CH_2N(CH_3)_2]_{2.7} \quad (X)$$

The reaction product may be a complex containing more than one metal atom, wherein the metal atoms are linked by at least one group $-NR'-$ or $-O-$, such complexes including, for example $(CH_3)_2NCH_2CH_2O][C_4H_9]_2Sn[N(CH_3)]Sn[C_4H_9]_3$
$[OCH_2CH_2N(CH_3)_2]$ (XI)

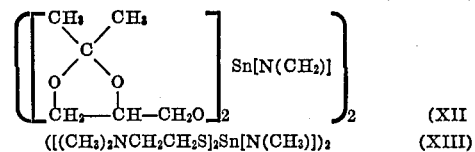
(XII)

$([(CH_3)_2NCH_2CH_2S]_3Sn[N(CH_3)])_2$ (XIII)

As a further aspect the present invention also includes an olefine polymerization process which comprises polymerizing an olefine monomer using an olefine catalyst in accordance with the present invention.

More particularly an olefine monomer is polymerized using a catalyst comprising a solid compound of a transition metal wherein the said metal has a valency below its maximum, preferably titanium trichloride, an aluminium trihydrocarbyl or aluminium dihydrocarbyl hydride compound preferably aluminium triethyl, and a complex compound of an element of Group IV of the Periodic System which is the reaction product of a compound of formula $$ME_{b-o}R_o$$

and a compound of formula $$H(X-G-L)$$

both compounds as hereinbefore defined.

The compound of a Group IV element is preferably obtained from a compound of the type $M(NR'_2)_{b-o}R_o$, particularly a tin compound. A particularly preferred polymerization process uses a Group IV compound which is the reaction product of $Sn(NR'_2)_4 + HO(CH_2)_xNR_2$ where $x$ is 2 or 3.

As a further aspect of the present invention an olefine monomer is polymerized using a catalyst comprising a solid compound of a transition metal wherein said metal has a valency below its maximum, preferably titanium trichloride, an aluminium trihydrocarbyl or aluminium dihydrocarbyl hydride compound, preferably aluminium triethyl, and a complex compound having the general formula $$ME_m(X-G-L)_nR_o$$

or a complex of said product containing more than one atom of M, all as hereinbefore defined.

The complex compound may be a compound of Formulae I to XIII as hereinbefore defined.

Any olefine monomer which is capable of being polymerized using a Ziegler catalyst may be polymerized using the process of the present invention. Thus, olefine monomers which may be polymerized by the present process include butene-1 and 4-methyl pentene-1 and particularly propylene.

We have found that the present process can be used for the polymerization of propylene to give a high rate of polymerization and a relatively low proportion of soluble polymer.

Thus, if propylene at a partial pressure of one atmosphere is polymerized using a catalyst comprising titanium trichloride, aluminium triethyl and a tin compound of Formulae III to V, or X, the maximum rate of polymerization is in the range 400–550 moles polymerized per mole $TiCl_3$ per hour and the amount of soluble polymer produced is in the range 10–14% by weight of the total polymer. Without the tin compound, the rate of polymerization is about 600 moles/mole $TiCl_3$/hour but the amount of soluble polymer is 25% by weight. Thus, the addition of the tin compound has produced a substantial reduction in the proportion of soluble polymer produced to give an acceptable proportion of soluble polymer. Although the rate of polymerization is also reduced by the addition of the tin compound, this reduction in rate is not such as to render the catalyst too inactive for satisfactory use. The loss in rate is mostly accounted for as a loss of soluble polymer, and in some cases the tin compound actually increases the yield of the desired solid polymer. Such an effect is obtained using a compound of Formula VII which gives a maximum rate of polymerization of nearly 800 moles polymerized per mole $TiCl_3$ per hour with about 18% of soluble polymer. The titanium trichloride used in the foregoing tests was the reduction product of titanium tetrachloride with aluminium. It has been found that the polymerization rate and proportion of soluble polymer formed is dependent on the nature of titanium trichloride used and the use of the reaction product of titanium tetrachloride and aluminium alkyl sesquihalide gives a higher rate of polymerization but also a higher proportion of soluble polymer.

The proportion of the third component also effects the rate of polymerization and proportion of soluble polymer produced. Furthermore, the effect of the third component is dependent on the number of heteroatoms (that is O, S, N or P) in the third component. Compounds containing O and/or N usually complex more strongly with the aluminium compounds than with titanium. Thus, the number of functional groups containing O and/or N should not exceed the amount of aluminium triethyl and usually should be kept considerably less, for example ¼ to ½ the amount of aluminium triethyl. However, using the third component in an amount such that the ratio of functional groups to Ti is <¼ does not produce the best catalyst. Thus, the minimum proportion of the third component is dependent on the titanium concentration and the upper limit is related to the aluminium triethyl concentration. More specifically, if the third component contains $f$ functional groups per molecule, the concentration of titanium trichloride is $C_T$ mmoles/litre and the concentration of aluminium triethyl is $C_A$ mmoles/litre, the concentration of the third component is preferably in the range $$C_T/4f \text{ to } C_A/2f \text{ mmole/litre}$$

Thus, if the basic catalyst system comprises 2 mmoles/litre of $TiCl_3$ and 4 mmoles/litre of aluminium triethyl, the concentration of a third component containing 2 functional groups (that is, O or N atoms) per molecule is preferably in the range ¼ to 1 mmole/litre and for a third component containing 4 functional groups, the concentration is preferably in the range ⅛ to ½ mmole/litre.

The present invention also provides a process for the production of a complex compound of an element of Group IV of the Periodic System wherein one mole of a compound of formula $$M'(NR'_2)_{b'-o}R_o$$

is reacted with one or more moles of a compound of the formula $$H(X\text{—}G\text{—}L)$$

wherein

R', X, R, G, L, and $o$ are as hereinbefore defined;
M' is an element of Group IV of the Periodic System having an atomic number greater than 14; and
$b'$ is the valency of M'.

It is preferred to carry out the process of the present invention using tin compounds as the Group IV compound. It is convenient, but not essential, to use compounds of the type $M'(NR'_2)_{b'}$ particularly $Sn(NR'_2)_4$.

The reaction proceeds with the evolution of a compound of the type $HNR'_2$ and it is thought that during the reaction the group $NR'_2$ is replaced by the group (X—G—L), and we have found that if a sufficient quantity of the compound H(X—G—L) is used, the amount of the compound $HNR'_2$ evolved corresponds to the complete elimination of the group $NR'_2$. By a suitable selection of the relative proportions of the compounds $M'(NR'_2)_{b'-o}R_o$ and H(X—G—L), the number of groups $NR'_2$ replaced during the reaction can be varied. More particularly, 1 mole of $M'(NR'_2)_{b'-o}R_o$ is reacted with an integral number of moles, from 1 up to $(b'-o)$, of H(X—G—L).

In a particularly preferred process one mole of a compound $Sn(NR'_2)_4$ is reacted with 1, 2, 3 or 4 moles of a compound of formula H(X—G—L).

The compound H(X—G—L) is conveniently an alkanolamine, a diamine or an aminothiol, for example a dialkylethanolamine, a trialkylethylene diamine or a dialkylaminoethane thiol.

It is particularly preferred to react one mole of a compound $Sn(NR'_2)_4$, for example $Sn[N(CH_3)_2]_4$, with 1, 2, 3 or 4 moles of a compound of formula $HO(CH_2)_xNR_2$ where $x$ is 2 or 3, for example dimethylethanolamine $HO(CH_2)_2N(CH_3)_2$.

The reaction between the Group IV compound and the compound H(X—G—L) can be carried out in an inert diluent such as benzene, petroleum ether or diethyl ether at a reaction temperature ranging from ambient, that is 15–25° C., up to the boiling point of the diluent, or up to 100° C. The extent of the reaction can be measured by titration of the displaced secondary amine $HNR'_2$. The product of such a reaction is believed to be a compound in which one or more of the groups $NR'_2$ are replaced by the group X—G—L. We have however found that the amine formed may include some of the tertiary amine $NR'_3$, which is thought to be produced by the formation of a complex containing more than one atom of M in which the atoms M are linked by a bivalent group —NR'—.

The product obtained by the reaction of the compound $M'(NR'_2)_{b'-o}R_o$ with the compound $$H(X\text{—}G\text{—}L)$$

both compounds as hereinbefore defined, is a compound having the general formula $$M'(NR')_2)_m(X\text{—}G\text{—}L)_nR_o$$

wherein

M', R', X, G, L, R and $o$ are as defined;
$m$ has a value of 0 to 3;
$n$ has a value of 1 to 4; and
$m+n+o$ is equal to the valency of M';

or complexes containing more than one atom of M' in which the atoms M' are linked by at least one bivalent group —NR'—, wherein each of said groups replaces one of the groups $NR'_2$ or R.

More specifically there are provided as novel compounds, compounds of Formulae II, and IV to XIII as hereinbefore defined.

The following examples are illustrative of the various aspects of the present invention:

EXAMPLE 1

Reaction of $Ti[N(CH_3)_2]_4$ and N,N-dimethyl ethanolamine $Ti[(CH_3)_2N]_4$ was prepared by reaction of $TiCl_4$ with $LiN(CH_3)_2$ in dry nitrogen using the technique described in J.C.S. (1960), p. 3857.

5 millimoles of N,N-dimethyl ethanolamine were placed in a reaction vessel which had been purged with nitrogen. A solution of 3.25 millimoles of $Ti[(CH_3)_2N]_4$ in 25 mls. of benzene were then added and dry nitrogen was then passed through the reaction vessel. The reaction vessel was not heated and reaction occurred at ambient temperature (about 20° C.). The outcoming nitrogen gas was bubbled through water containing screened methyl orange indicator and kept neutral with $N/5H_2SO_4$. A total of 6.5 millimoles of base were titrated. The aqueous titration solution was evaporated to near dryness and the amine regenerated by warming with caustic potash. The material obtained in this manner was shown by infrared analysis to be mostly dimethylamine with some trimethylamine, indicating that some condensation of the product had taken place. The titration of the base indicated that the following reactions had taken place:

$3.25Ti[N(CH_3)_2]_4 + 5(CH_3)_2N \cdot CH_2CH_2OH \rightarrow$
$1.75Ti[N(CH_3)_2]_2[O \cdot CH_2CH_2 \cdot N(CH_3)_2]_2$
$+ 0.75[(CH_3)_2NCH_2CH_2O][N(CH_3)_2]$
$Ti[N(CH_3)]_2Ti[N(CH_3)_2][OCH_2CH_2N(CH_3)_2]$
$+ 5NH(CH_3)_2 + 1.5N(CH_3)_3$ When the reaction was complete, the benzene was evaporated off. A yellow-orange product was obtained and this was dissolved in benzene.

EXAMPLE 2

(a) Preparation of
$nBu_2Sn[N(CH_3)_2][OCH_2CH_2N(CH_3)_2]$
condensation product 2.5 millimoles of $nBu_2Sn[N(CH_3)_2]_2$ (prepared as described in J.C.S. (1965), p. 1944) were added in 25 ml. benzene to 2.5 millimoles of N,N-dimethylethanolamine as in Example 1. 4.0 millimoles of base, which included some trimethylamine, were titrated after evaporation of the benzene. The titaration indicated that the following reactions had occurred to give a condensation product.

$2.5Bu_2Sn[N(CH_3)_2]_2 + 2.5HO \cdot CH_2CH_2N(CH_3)_2 \rightarrow$
$2.5Bu_2Sn[(CH_3)_2N \cdot CH_2CH_2O]$
$[N(CH_3)_2] + 2.5NH(CH_3)_2$ $2.5Bu_2Sn[(CH_3)_2NCH_2CH_2O][N(CH_3)_2] \rightarrow$
$1.25[(CH_3)_2NCH_2CH_2O]Bu_2Sn[N(CH_3]$
$SnBu_2[OCH_2CH_2N(CH_3)_2] + 1.25N(CH_3)_3$ (b) Preparation of $nBu_2Sn[OCH_2CH_2N(CH_3)_2]_2$ The procedure of Example 2(a) was repeated using 5 millimoles of N,N-dimethylethanolamine. Titration of base evolved (dimethylamine) indicated that complete reaction had occurred to give a compound of formula $nBu_2Sn[OCH_2CH_2N(CH_3)_2]_2$

EXAMPLE 3

(a) Preparation of $Sn[N(CH_3)_2][OCH_2CH_2N(CH_3)_2]_3$

This product was obtained by reaction of 1.5 millimoles $Sn[N(CH_3)_2]_4$ with 4.5 millimoles of N,N-dimethylethanolamine the conditions being otherwise as in Example 2(b). Titration of the base indicated complete reaction to give a compound of formula $Sn[N(CH_3)_2][OCH_2CH_2N(CH_3)_2]_3$ (b) Preparation of $Sn[OCH_2CH_2NMe_2]_4$ This compound was prepared as in Example 3(a), but using a small excess of N,N-dimethylethanolamine (10 millimoles to 2 millimoles Sn). The excess of N,N-dimethylethanolamine was removed by distillation in a stream of nitrogen leaving an orange oil which was then dissolved in benzene.

EXAMPLE 4

Preparation of $Sn[OCH_2CH_2OCH_3]_4$

This compound was made as in Example 3(b) but using a small excess of 2-methoxyethanol.

EXAMPLE 5

Preparation of $Sn[N(CH_3)_2]_{1.3}$
$[N(CH_3)CH_2CH_2N(CH_3)_2]_{2.7}$

This compound was made by a transamination wherein 1 millimole of $Sn[N(CH_3)_2]_4$ was reacted with 4 millimoles of N,N,N'-trimethylethylene diamine. Unreacted diamine distilled over with the benzene when the latter had nearly all been removed. A total of 5.3 milliequivalents of base were titrated from which it was deduced that the transamination was only partial to give a product having the above formula. The reaction product was a thick yellow oil at room temperature which was subsequently dissolved in benzene.

EXAMPLE 6

(a) Preparation of $Sn[N(CH_3)_2]$
$[O \cdot CH_2C_5H_4N]_3$ condensation product 3.3 millimoles of $Sn[N(CH_3)_2]_4$ were reacted in benzene with 10 millimoles of 2-pyridylcarbinol at room temperature and 11.6 millimoles of base were titrated. The presence of some 15% of trimethylamine in the dimethylamine produced was determined by infra-red spectroscopy. The product formed was the condensation compound given by the reaction:

$3.3Sn[N(CH_3)_2]_4 + 9.9C_5H_4NCH_2OH \rightarrow$
$3.3Sn[N(CH_3)_2]_1 \cdot O \cdot CH_2C_5H_4N]_3 + 9.9NH(CH_3)_2$

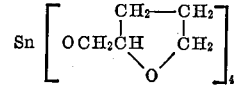

$1.65[NC_5H_4CH_2O]_3Sn,NCH_3]Sn[OCH_2C_5H_4N]_3 + 1.65N(CH_3)_3$

The product was an amber coloured glassy solid which was dissolved in benzene.

(b) Preparation of $Sn[OCH_2C_5H_4N]_4$

This compound was made as in Example 3(b) but using stoichiometric amounts, that is a molar ratio of 4:1, of 2-pyridylcarbinol and tin amide. The product was an orange-red waxy solid and was dissolved in benzene for subsequent use.

EXAMPLE 7

Preparation of

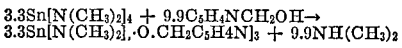

4 millimoles of tetrahydrofurfuryl alcohol were added to 0.85 millimole of $Sn[N(CH_3)_2]_4$ in 25 cm.³ of benzene. The solution was heated to about 180° C. in a stream of dry argon which removed the benzene and the excess alcohol. The exit gas was bubbled through sulphuric acid and 3.44 millimoles of base were titrated. The product was a brown syrupy liquid which was dissolved in 50 cm.³ of benzene.

EXAMPLE 8

Preparation of condensation of product of $Sn[N(CH_3)_2]_4$ and 2,2-dimethyl-1,3-dioxolane-4-methanol

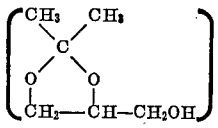

were added to 1 millimole of $Sn[N(CH_3)_2]_4$ in 18 cm.³ of benzene. The solution was heated to about the boiling point of benzene in a stream of argon to distil the benzene and remove the amine reaction products. The exit gas stream was bubbled through sulphuric acid and a total of 2.82 millimoles of bases were titrated indicating that reaction had occurred with the evolution of 2 millimoles of dimethylamine, followed by condensation of the tin compound with the elimination of about 0.82 millimole of trimethylamine. The product obtained was dissolved in 50 cm.³ benzene. This product was believed to be essentially of Formula X containing two $Sn-N(CH_3)-Sn$ linkages but also including a material having only one $$Sn-N(CH_3)-Sn \text{ linkage.}$$

EXAMPLE 9

(a) Preparation of condensation product of $Sn[N(CH_3)_2]_4$ and 2-dimethylamino-ethane-thiol 2 millimoles of 2-dimethylamino-ethane-thiol $$((CH_3)_2NCH_2CH_2SH)$$

were added to one millimole of $Sn[N(CH_3)_2]_4$ in 12 cm.³ of benzene. The procedure of Example 8 was repeated and a total of 3 millimoles of base were titrated from the gas stream. The following reaction was believed to have occurred.

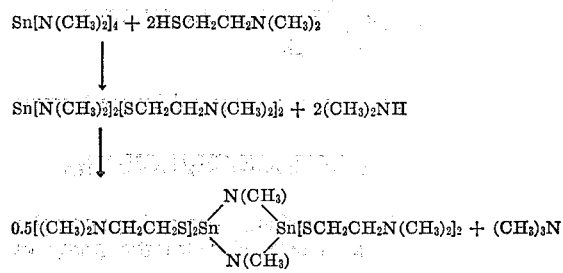

The product was a yellow solid which was dissolved in 50 cm.³ of benzene.

(b) Preparation of $Sn[SCH_2CH_2N(CH_3)_2]_4$

The general procedure of Example 9(a) was repeated by adding 4 millimoles of the thiol compound to one millimole of the tin compound in 15 cm.³ of benzene. 4.1 millimoles of base were titrated and the product, a yellow oil, was dissolved in 50 cm.³ of benzene.

EXAMPLE 10

Preparation of $(CH_3)_2Si[O \cdot CH_2CH_2N(CH_3)_2]_2$ $(CH_3)_2Si[N(CH_3)_2]_2$ was prepared by reaction of $(CH_3)_2SiCl_2$ with $LiN(CH_3)_2$ in dry nitrogen using the general technique of Examples 1 and 2.

3 millimoles of $(CH_3)_2Si[N(CH_3)_2]_2$ were added in 25 ml. benzene to 10 millimoles N,N-dimethyl ethanolamine and a stream of dry nitrogen passed through the reaction vessel as described in Example 1. 5 millimoles of base were titrated with the reaction at room temperature (nearly all the theoretical $(CH_3)_2NH$). The reaction was completed and excess ethanolamine removed by evaporation of the benzene. A light yellow solid complex was obtained and this was dissolved in benzene.

EXAMPLES 11 TO 30

The products of Examples 1 to 10 were then used as olefine polymerization catalyst third components. The effect of the Group IV complex reaction products was tested in propylene polymerizations using triethyl aluminium and a commercially available form of titanium trichloride manufactured by Toho Titanium Company of Japan and identified as TAC 131. (This material is believed to be obtained by the reduction of $TiCl_4$ with aluminium metal and thereafter ball-milling the dry powder.)

A polymerization flask equipped with efficient stirrer and a water jacket was dried carefully and 1 litre of an inert hydrocarbon diluent having a boiling range of about 170–175° C. was introduced. The diluent was evacuated at 60° C. and saturated with propylene to one atmosphere pressure. 4 millimoles of triethylaluminium were introduced, followed by the complex to be tested. After ½ hour 2 millimoles of $TiCl_3$ were introduced. The pressure in the reaction vessel was maintained at one atmosphere by supply of propylene from a burette whose level was recorded every 2 minutes to follow the course of the reaction. After a further 2½ hours the run was terminated with 10 ml. of isopropanol and a sample of supernatant liquid extracted for determining the concentration of soluble polymer. The solid was filtered and washed three times with petrol ether and dried in a vacuum oven at 120° C. for an hour. The yield of solid plus calculated soluble polymer equalled within experimental error the propylene lost from the burette.

The results obtained are set out in Table I.

TABLE I

| Polymerization Example | Complex [d] | Amt. (mM./l.) | Polymerization rate [a] Max | Polymerization rate [a] Final | Conversion [b] to solid | Percent soluble yield |
|---|---|---|---|---|---|---|
| A | None added | Nil | 600 | 270 | 700 | 25 |
| 11 | I | 0.3 | 420 | 300 | 740 | 17.9 |
| 12 | II plus condensation product. | 1.0 | 330 | 270 | 520 | 13.8 |
| 13 | XI | 0.5 | 440 | 230 | 620 | 16.7 |
| 14 | III | 0.25 | 570 | 300 | 620 | 18.4 |
| 15 | III | 0.5 | 540 | 330 | 620 | 16.4 |
| 16 | III | 1.0 | 590 | 200 | 520 | 12.4 |
| 17 | IV | 0.15 | 460 | 280 | 710 | 14.5 |
| 18 | IV | 0.3 | 350 | 220 | 550 | 12.3 |
| 19 | V | 0.3 | 450 | 280 | 650 | 13.7 |
| 20 | VI | 0.3 | 360 | 230 | 600 | 18.0 |
| 21 | X | 0.3 | 450 | 280 | 650 | 13.7 |
| 22 | Condensation product VII. | 0.17 | 480 | 300 | 740 | 15.2 |
| 23 | do | .33 | 420 | 240 | 650 | 13.2 |
| 24 | do | ᵒ0.66 | 240 | 90 | 350 | 7.1 |
| 25 | VII | 0.2 | 780 | 370 | 930 | 18.3 |
| 26 | VIII | 0.4 | 460 | 180 | 690 | 15 |
| 27 | IX | 0.2 | 270 | 160 | 430 | 10.4 |
| 28 | XII | 0.1 | 640 | 360 | 935 | 17.7 |
| 29 | XIII | 0.05 | 400 | 200 | 570 | 15 |
| 30 | XIII | 0.2 | 320 | 170 | 490 | 12 |

Notes to Table I: (a) Rate units: Moles $C_3H_6$ polymerized per mole $TiCl_3$ per hour. (b) Conversion units: Moles $C_3H_6$ per mole $TiCl_3$. (c) Polymerization did not proceed till a further 4 millimoles $Et_3Al$ were added. (d) The complex reaction products were as follows: (I) The product of Example 10. (II plus condensation product). The product of Example 1 which is believed to be a mixture of a compound of formula II and a condensation product including two $Ti[N(CH_3)]Ti$ linkages. (III) The product of Example 2(b). (IV) The product of Example 3(a). (V) The product of Example 3(b). (VI) The product of Example 4. (VII) The product of Example 6(b). (Condensation product VII) The product of Example 6(a) (VIII) The product of Example 7. (IX) The product of Example 9(b). (X) The product of Example 5. (XI) The product of Example 2(a). (XII) The product of Example 8. (XIII) The product of Example 9(a).

EXAMPLES 31 TO 34

Propylene polymerizations were also carried out with $TiCl_3$ obtained by reduction of $TiCl_4$ with ethylaluminium sesquichloride by the addition of 0.9 mole of the aluminium compound to 1.0 mole of $TiCl_4$, both compounds being dissolved in inert hydrocarbon diluent and maintained at 0° C. during the preparation. The results obtained are set out in Table II.

TABLE II

| Polymerization Example | Complex | Amount moles/litre | Polymerization rate Max | Polymerization rate Final | Conversion to solid | Percent soluble yield |
|---|---|---|---|---|---|---|
| B | None added | Nil | 1,160 | 350 | 810 | 38 |
| 31 | I | 0.3 | 560 | 200 | 750 | 18.3 |
| 32 | I | 0.55 | 420 | 300 | 560 | 21.7 |
| 33 | X | 0.6 | 480 | 300 | 590 | 28.6 |
| 34 | XI | 0.1 | 360 | 240 | 490 | 21 |

EXAMPLES 35 TO 37

The procedure of Examples 11 to 30 was repeated using aluminium compounds other than aluminium triethyl. Comparative tests were also carried out in the absence of a complex Group IV compound. The experimental details and results obtained are summarized in Table III.

TABLE III

| Example | Complex | Amount, mMoles/litre | Aluminium compound [1] | Polymerisation rate | | Conversion to solid | Percent soluble yield |
|---|---|---|---|---|---|---|---|
| | | | | Max | Final | | |
| 35 | V | 0.3 | nPr₃Al | 460 | 260 | 600 | 15.7 |
| C | None | Nil | nPr₃Al | 750 | 370 | 765 | 43 |
| 36 | V | 0.3 | nBu₃Al | 530 | 270 | 630 | 24.3 |
| D | None | Nil | nBu₃Al | 670 | 405 | 750 | 42 |
| 37 | V | 0.3 | iBu₃Al | 350 | 300 | 495 | 25.7 |
| E | None | Nil | iBu₃Al | 700 | 450 | 620 | 48 |

[1] nPr=normal propyl. nBu=normal butyl. iBu=isobutyl.

I claim:
1. An olefine polymerization catalyst comprising: (a) titanium trichloride; (b) an aluminium trihydrocarbyl or aluminium dihydrocarbyl hydride compound; and (c) a complex compound of an element of Group IV of the Periodic System which is the preformed reaction product of (d) a compound of formula

$$ME_{b-o}R_o$$

and (e) a compound of formula $$H(X\text{---}G\text{---}L)$$

where:
M is titanium or tin;
E is a group —NR'$_2$ or —OR', where R' is a methyl or ethyl group;
X is O, S, NR or PR;
R is a hydrocarbyl group;
G is alkylene of 1–3 carbons such that X and L are separated by not more than 3 carbon atoms;
L is OR, SR, NR$_2$, PR$_2$ or a heterocyclic ring system whereof the heteroatom is O, S, N, or P which is not directly linked to hydrogen;
b is the valency of M; and
o has a value of 0 to 2.

2. A catalyst as claimed in claim 1 wherein the aluminium compound is aluminium triethyl.
3. A catalyst as claimed in claim 1 wherein the compound (d) is Sn(NR'$_2$)$_{b-o}$R$_o$.
4. A catalyst as claimed in claim 1 wherein the compound (e) is an alkanolamine, a diamine or an aminothiol compound.
5. A catalyst as claimed in claim 1 wherein (c) is the product of reacting Sn(NR'$_2$)$_4$ and HO(CH$_2$)$_x$NR$_2$ where x is 2 or 3.
6. An olefine polymerization catalyst comprising: (a) titanium trichloride; (b) an aluminium trihydrocarbyl or aluminium dihydrocarbyl hydride compound; and either (c) a complex compound having the general formula $$Me_m(X\text{---}G\text{---}L)_nR_o$$

where
M is titanium or tin;
E is a group —NR'$_2$ or —OR', where R is a methyl or ethyl group;
X is O, S, NR or PR;
R is a hydrocarbyl group;
G is alkylene of 1–3 carbons such that X and L are separated by not more than 3 carbon atoms;
L is OR, SR, NR$_2$, PR$_2$ or a heterocyclic ring system whereof the heteroatom is O, S, N, or P which is not directly linked to hydrogen;
o has a value of 0 to 2;
m has a value of 0 to 3;
n has a value of 1 to 4; and
m+n+o is equal to the valency of M;
and/or (d) complexes of M derived from complex compound (c) which complexes contain more than one atom of M in which the atoms M are linked by at least one bivalent group —NR'— or —O— wherein each of the bivalent groups replaces one of the groups E or R attached to the atom M.

7. A catalyst as claimed in claim 6 containing a complex compound (c) which is selected from the group of compounds consisting of:

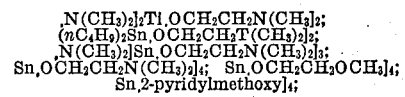
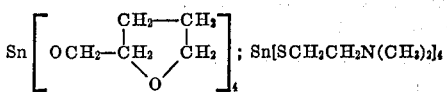

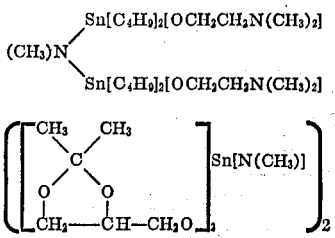

and a mixture of compounds represented by the formula $$Sn[N(CH_3)_2]_{1.3}[N(CH_3)CH_2CH_2N(CH_3)_2]_{2.7}$$

8. A catalyst as claimed in claim 6 containing a complex compound (d) which is selected from the group of compounds

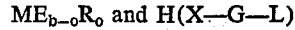

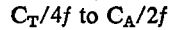

and ([(CH$_3$)$_2$NCH$_2$CH$_2$S]$_2$Sn[N(CH$_3$)])$_2$.

9. An olefin polymerization process comprising polymerising an olefin monomer using the olefin polymerization catalyst of claim 1.
10. A process according to claim 9 wherein propylene is polymerized.
11. A process according to claim 10 wherein polymerization is effected using a catalyst comprising (a) titanium trichloride, (b) aluminium triethyl and (c) a preformed reaction product of $$ME_{b-o}R_o \text{ and } H(X\text{---}G\text{---}L)$$

wherein the concentration of titanium trichloride is $C_T$ mmoles/liter; the concentration of aluminium triethyl is $C_A$ mmoles/liter and the concentration of (c) is in the range $$C_T/4f \text{ to } C_A/2f$$

where $f$ is the number of functional groups containing O and/or N per molecule of (c).
12. A process according to claim 10 wherein the catalyst contains a titanium trichloride-containing material which is the reduction product of titanium tetrachloride with aluminium.

13. An olefin polymerization process comprising polymerising an olefin monomer using the olefin polymerization catalyst of claim 6.

References Cited

UNITED STATES PATENTS

| | | | |
|---|---|---|---|
| 3,196,137 | 7/1965 | Coin | 260—94.9 E |
| 3,219,648 | 11/1965 | Hill | 260—94.9 C |
| 3,189,590 | 6/1965 | Coover et al. | 260—94.9 C |

FOREIGN PATENTS 1,354,815  2/1964  France.

JOSEPH L. SCHOFER, Primary Examiner

E. J. SMITH, Assistant Examiner

U.S. Cl. X.R.

252—429 B, 429 C; 260—94.9 E

UNITED STATES PATENT OFFICE
CERTIFICATE OF CORRECTION

Patent No. 3,766,160            Dated October 16, 1973

Inventor(s) Anthony David Caunt

It is certified that error appears in the above-identified patent and that said Letters Patent are hereby corrected as shown below:

(1) Column 8, line 70, before the formula of Example 8, insert

--2 millimoles of 2,2-dimethyl-1,3-dioxolane-4-methanol--.

Signed and sealed this 2nd day of July 1974.

(SEAL)
Attest:

EDWARD M. FLETCHER, JR.                C. MARSHALL DANN
Attesting Officer                       Commissioner of Patents